(12) United States Patent
Nagano

(10) Patent No.: US 10,166,843 B2
(45) Date of Patent: Jan. 1, 2019

(54) VEHICLE AIR-CONDITIONING APPARATUS

(71) Applicant: Valeo Japan Co., Ltd., Saitama (JP)

(72) Inventor: Hideki Nagano, Saitama (JP)

(73) Assignee: Valeo Japan Co., Ltd., Saitama (JP)

( * ) Notice: Subject to any disclaimer, the term of this patent is extended or adjusted under 35 U.S.C. 154(b) by 72 days.

(21) Appl. No.: 15/081,243

(22) Filed: Mar. 25, 2016

(65) Prior Publication Data

US 2016/0288622 A1 Oct. 6, 2016

(30) Foreign Application Priority Data

Apr. 6, 2015 (JP) .................. 2015-078025

(51) Int. Cl.
*B60H 3/06* (2006.01)
*B60H 1/32* (2006.01)

(52) U.S. Cl.
CPC ......... *B60H 3/0616* (2013.01); *B60H 1/3233* (2013.01)

(58) Field of Classification Search
CPC ............................ B60H 1/3233; B60H 3/0616
USPC ........................................................ 454/158
See application file for complete search history.

(56) References Cited

U.S. PATENT DOCUMENTS

| 5,966,959 A * | 10/1999 | Stewart | F24F 13/222 62/285 |
| 6,070,425 A * | 6/2000 | Ito | B60H 1/00028 62/285 |
| 6,129,140 A * | 10/2000 | Kawahara | B60H 1/00521 165/42 |
| 6,883,336 B2 * | 4/2005 | Dudley | F24F 13/222 62/115 |
| 6,978,909 B2 * | 12/2005 | Goetzinger | F24F 13/222 220/571 |

FOREIGN PATENT DOCUMENTS

| CN | 101737931 A | 6/2010 |
| CN | 103097156 A | 5/2013 |

(Continued)

OTHER PUBLICATIONS

EP2514617A2 English Translation.*
The First Office Action issued in corresponding Chinese Patent Application No. 201610204896.4, dated Oct. 16, 2017 (12 pages).

*Primary Examiner* — Steven B McAllister
*Assistant Examiner* — Allen Schult
(74) *Attorney, Agent, or Firm* — Osha Liang LLP

(57) ABSTRACT

A vehicle air-conditioning apparatus includes a case including an air passage therein and a filter arrangement area provided in the air passage for arranging a filter. The case includes: a drain port provided on a bottom portion of a downstream-side air passage in the filter arrangement area; an insertion port provided on a side surface of the case and configured to allow insertion of the filter into the filter arrangement area; a water receiving portion provided on a bottom portion of an upstream air passage in the filter arrangement area; a drain channel passing below the filter arrangement area and configured to introduce water from the water receiving portion to the drain port; and a waterproof wall that covers a lower corner portion on the insertion port side of an upstream-side boundary of the filter arrangement areas. The waterproof wall is increased in height toward the insertion port.

12 Claims, 6 Drawing Sheets

(56) References Cited

FOREIGN PATENT DOCUMENTS

| | | | |
|---|---|---|---|
| EP | 2514617 | A2 | 10/2012 |
| FR | 2865159 | A1 | 7/2005 |
| JP | S59-19782 | A | 2/1984 |
| JP | 10-016532 | A | 1/1998 |

\* cited by examiner

VEHICLE AIR-CONDITIONING APPARATUS

BACKGROUND OF THE INVENTION

1. Field of the Invention

The present invention relates to a vehicle air-conditioning apparatus, and more specifically; to a vehicle air-conditioning apparatus provided with an insertion port for mounting and dismounting a filter on a side surface of a case.

2. Related Art

A vehicle air-conditioning apparatus is often provided with a filter upstream of a heat exchanger for cooling. The filter needs a maintenance such as cleaning or replacement. Therefore, in a state in which the vehicle air-conditioning apparatus is installed on a vehicle, the filter can be mounted and dismounted through an insertion port provided on a side surface of a case. Since the vehicle air-conditioning apparatus has a structure which may suck outside air from outside of the vehicle, a case where rain water is introduced into an interior of the apparatus and is accumulated upstream of the filter is considered. When the amount of water accumulated upstream of the filter increases, there is a fear that water level rises and reaches the filter insertion port, and finally a problem of leakage of the water outward of the apparatus may result. In order to solve the problem described above, a technology providing a configuration in which water leakage from the insertion port is prevented by providing a guide rail on a lower portion of the filter and a drainage channel that couples an upstream side of the guide rail and a drain port provided on a downstream side, and introducing water accumulated upstream of the filter to the drain port is proposed (for example, see Patent Literature 1).

CITATION LIST

Patent Literature

PTL 1: JP-A-10-016532

However, the vehicle air-conditioning apparatus may be inclined forward, rearward, leftward, and rightward because the vehicle on which the vehicle air-conditioning apparatus is mounted does not necessarily keep a horizontal posture. In particular, in the case where the vehicle is inclined with the filter insertion port faces downward, the position of a lower side of the filter insertion port may take a position lower than the drain port. There is also a case where the water level of water accumulated upstream of the filter comes to a position higher than the filter insertion port. Therefore, only with the configuration in which the drainage channel is provided as in the Patent Literature 1, water leakage from the insertion port cannot be prevented when the vehicle is inclined so that the filter insertion port faces downward.

SUMMARY OF THE INVENTION

It is an object of the invention to provide a vehicle air-conditioning apparatus which does not allow water leakage from a filter insertion port even when a vehicle takes an inclined posture in which the filter insertion port faces downward.

The invention provides a vehicle air-conditioning apparatus including: a case including an air passage in an interior thereof; and a filter arrangement area provided in the air passage for arranging a filter, in which the case includes: a drain port provided on a bottom portion of a downstream-side air passage in the filter arrangement area; an insertion port provided on a side surface of the case and configured to allow insertion of the filter into the filter arrangement area; a water receiving portion provided on a bottom portion of an upstream air passage in the filter arrangement area; a drain channel passing below the filter arrangement area and configured to introduce water from the water receiving portion to the drain port; and a waterproof wall configured to cover a lower corner portion on the insertion port side of an upstream-side boundary of the filter arrangement area, and the waterproof wall is increased in height as it goes toward the insertion port.

According to the vehicle air-conditioning apparatus of the invention, preferably, the drain channel passes through a substantially center portion of the case in a direction of insertion of the filter. Water in the water receiving portion can be effectively drained by the drain channel. In addition, when the case has a left and right two-part structure, the drain channel can be easily formed.

According to the vehicle air-conditioning apparatus of the invention, preferably, the case further includes a guide wall extending along the direction of insertion of the filter, and the waterproof wall is an upward extending portion of the guide wall. Since the guide wall guides the side surface of the filter at the time of insertion of the filter, a filter mounting operation can be performed with higher efficiency.

According to the vehicle air-conditioning apparatus of the invention, preferably, the case further includes a pair of leg walls extending upright from a bottom surface of the case in parallel to each other along the direction of insertion of the filter at a position downward of the filter arrangement area, and a floor wall extending between the pair of leg walls for placing the filter. With the floor wall extending between the pair of leg walls, an area downward of the filter becomes a water storage portion, so that water leakage from the filter insertion port can be prevented even when a large amount of water flows into the apparatus at a time. In addition, the filter can be arranged with higher stability. Furthermore, adhesion of water to the bottom surface of the filter can be prevented.

According to the vehicle air-conditioning apparatus of the invention, preferably, the drain channel includes an upstream port formed by notching part of the leg wall arranged on the upstream side of the air passage and a downstream port formed by notching part of the leg wall arranged on the downstream side of the air passage, and the upstream port is larger than the downstream port. Water in the water receiving portion can be effectively drained by the drain channel.

According to the vehicle air-conditioning apparatus of the invention, preferably, the drain channel and the water receiving portion are formed by depressing the bottom surface of the case. When the case has a three-part configuration divided into left, right, and bottom parts, the drain channel and the water receiving portion can be easily formed.

The invention provides a vehicle air-conditioning apparatus which does not allow water leakage from a filter insertion port even when a vehicle takes an inclined posture in which a filter insertion port faces downward.

DETAIL DESCRIPTION OF THE INVENTION

Referring now to the attached drawings, a mode of the invention will be described. An embodiment described below is an example of the invention, and the invention is not limited to the following embodiment. In the specification and the drawings, components having identical reference signs are the same components. Various modifications may be made for achieving advantageous effects of the invention.

Figure 1:
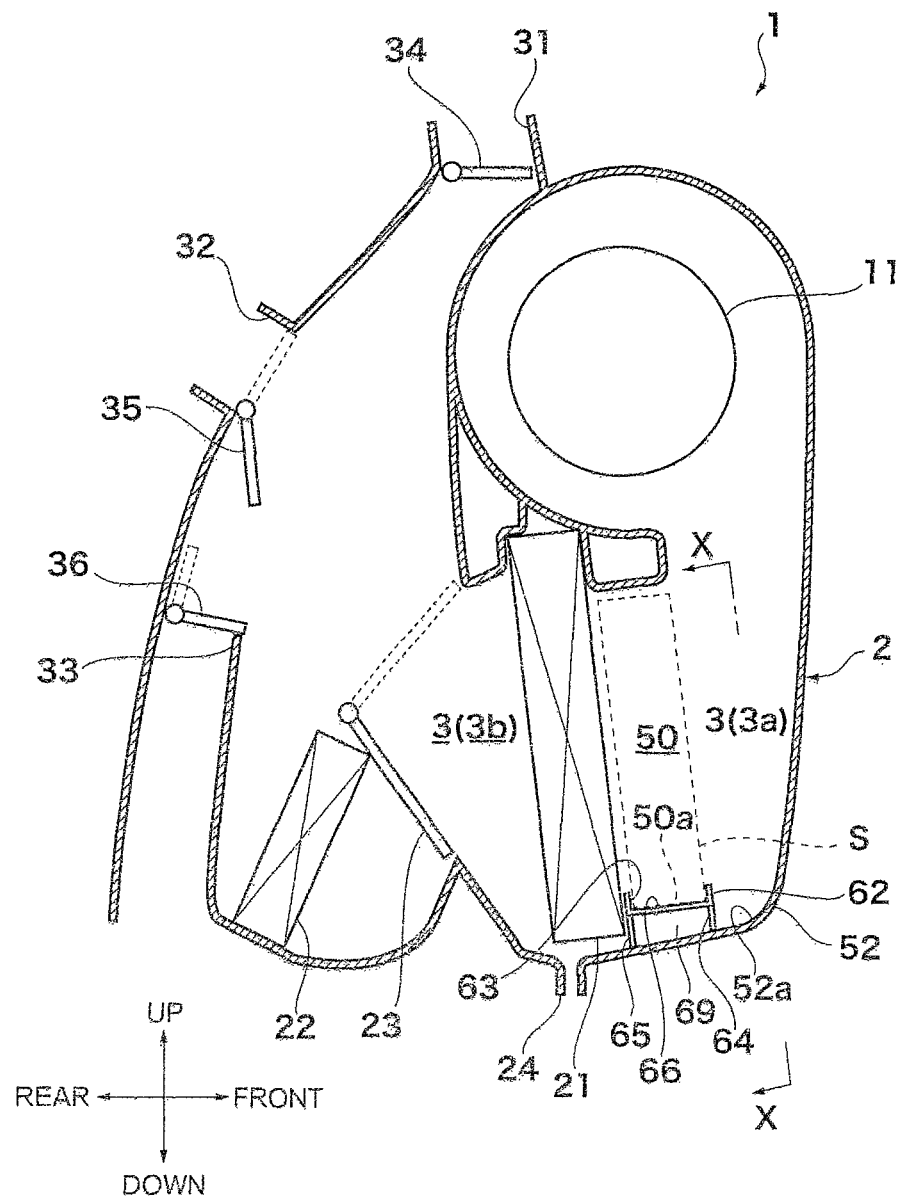
FIG. 1 is a vertical cross-sectional view of a vehicle air-conditioning apparatus according to an embodiment of the invention illustrating an example of the vehicle air-conditioning apparatus of the embodiment.
Figure 2:
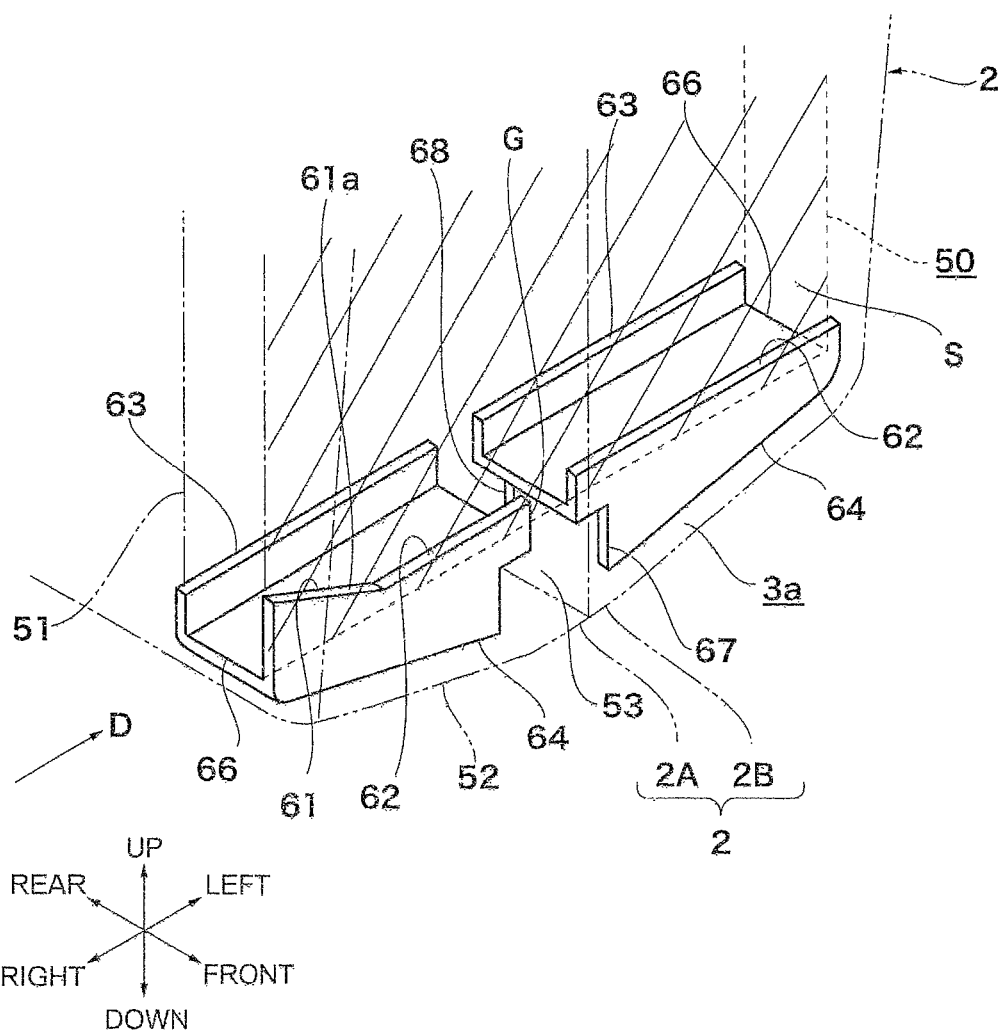
FIG. 2 is a perspective view illustrating part of the vehicle air-conditioning apparatus showing inside through a case.

As illustrated in FIGS. 1 and 2, the embodiment provides a vehicle air-conditioning apparatus 1 including: a case 2 including an air passage 3 in an interior thereof and a filter arrangement area 50 in the air passage 3 for arranging a filter (not illustrated), in which the case 2 includes: a drain port 24 (illustrated in FIG. 1) provided on a bottom portion of a downstream-side air passage 3b in the filter arrangement area 50, an insertion port 51 (illustrated in FIG. 2) provided on a side surface of the case 2 and configured to allow insertion of the filter into the filter arrangement area 50; a water receiving portion 52 provided on a bottom portion of an upstream air passage 3a in the filter arrangement area 50; a drain channel 53 (illustrated in FIG. 2) passing below the filter arrangement area 50 and configured to introduce water from the water receiving portion 52 to the drain port 24; and a waterproof wall 61 (illustrated in FIG. 2) configured to cover a lower corner portion on the insertion port 51 side of an upstream-side boundary S of the filter arrangement area 50, and the waterproof wall 61 is increased in height as it goes toward the insertion port 51.

As illustrated in FIG. 1, the case 2 forms an outline of the vehicle air-conditioning apparatus 1 and has the air passage 3 in the interior thereof. The case 2 is provided with an outside air introduction port (not illustrated) and an inside air introduction port (not illustrated) at an upstream most portion of the air passage 3. The outside air introduction port or the inside air introduction port are selectively opened and closed by an inside and outside air switching door (not illustrated). The case 2 is also provided with a defrost opening 31, an air-ventilation opening 32, and a foot opening 33 formed at a downstream-most portion of the air passage 3. The openings 31, 32, and 33 are connected to blow-out ports (not illustrated) in a cabin indirectly or directly via ducts (not illustrated), respectively. The opening degrees of the openings 31, 32, and 33 are adjusted respectively by mode doors 34, 35, and 36.

For example, a blower 11 and a cooling heat exchanger 21 are arranged in the air passage 3.

The blower 11 is arranged downstream of the inside and outside air switching door (not illustrated). The blower 11 supplies blown air to the air passage 3.

The heat exchanger for cooling 21 is arranged downstream of the blower 11. The beat exchanger for cooling 21 allow passage of refrigerant as part of a refrigerating cycle (not illustrated), and cools the blown air as needed. The air passage 3 may be provided with a heat exchanger for heating 22 and an air-mixing door 23 arranged downstream of the cooling heat exchanger 21. The heat exchanger for heating 22 allows warm water warmed by waste heat of an engine, for example, to pass therethrough, and heats the blown air as needed. The air-mixing door 23 adjusts a percentage of air (cold air) bypassing the heat exchanger for heating 22 and a percentage of air (warm air) passing through the heat exchanger for heating 22.

In the embodiment, as illustrated in FIG. 1, the filter arrangement area 50 is provided in the upstream air passage 3a of the heat exchanger for cooling 21. The filter arrangement area 50 is a space in which the filter (not illustrated) is arranged as needed. The filter (not illustrated) removes dust or odor in the blown air.

In the embodiment, the case 2 includes the drain port 24, the insertion port 51, the water receiving portion 52, the drain channel 53, and the waterproof wall 61. The case 2 may be composed of either left and right two-part structure or left, right, and lower three-part structure. FIG. 2 illustrates a mode in which the case 2 has the left and right two-part structure as an example. By the "left and right two-part structure" is meant a structure in which two case members 2A and 2B molded into left and right halves with respect to the vehicle are unified and constitute the entire case 2. By the "left, right, and lower three-part structure" is meant a structure in which three case members molded into left, right and, lower parts with respect to the vehicle are unified and constitute the entire case 2. The invention is not limited by number of divided parts of the case, and if the case 2 is divided into three parts instead of the two-part structure, the same configuration is applicable.

The drain port 24 is a hole opening on the bottom portion of the downstream-side air passage 3b of the filter arrangement area 50. A mode in which the drain port 24 is provided at a bottom portion where the heat exchanger for cooling 21 is arranged is illustrated in FIG. 1 as an example. However, the position of the drain port 24 is not specifically limited as long as it is formed on the bottom portion of the downstream-side air passage 3b of the filter arrangement area 50.

The insertion port 51 is a hole opening on the side surface of the case 2, and has a shape which allow the filter (not illustrated) to be mounted on or demounted from the case 2 freely therethrough. A mode in which the insertion port 51 is provided on a surface facing rightward of the vehicle out of the side surfaces of the case 2 is illustrated in FIG. 2 as an example. However, the invention is not limited thereto. For example, the insertion port 51 may be provided on either a side surface facing leftward, or a side surface facing rearward of the vehicle of the case 2 (not illustrated).

The water receiving portion 52 is a space provided on the bottom portion of the upstream-side air passage 3a of the filter arrangement area 50, and rain water entering from the outside air introduction port (not illustrated) is temporarily stored. As illustrated in FIG. 1, a bottom surface 52a of the water receiving portion is located below a bottom surface 50a of the filter arrangement area in the vehicle.

The drain channel 53 is a water channel provided below the filter arrangement area 50 as illustrated in FIG. 2, and is configured to communicate the water receiving portion 52 with a space where the drain port 24 (illustrated in FIG. 1) is arranged. According to the vehicle air-conditioning apparatus 1 of the embodiment, preferably, the drain channel 53 passes through a substantially center portion of the case 2 in a direction of insertion D of the filter as shown in FIG. 2. The drain port 24 is provided at a center portion of the case 2 in the lateral direction in many cases, and when the vehicle is in a horizontal state, water in the water receiving portion 52 can be drained efficiently by the drain channel 53. When the case 2 has a left and right two-part structure, the drain channel 53 can be formed easily.

The waterproof wall 61 is a plate-shaped projection projecting from an inner wall surface of the case 2. The waterproof wall 61 preferably projects from an inner wall surface out of the side surfaces of the case 2 where the insertion port 51 is provided as illustrated in FIG. 2. The waterproof wall 61 may project from an inner wall surface of the bottom surface of the case 2 (not illustrated). Even though the vehicle is inclined with the insertion port 51 facing downward and the level of water stored in the water receiving portion 51 rises on the insertion port 51 side, the waterproof wall 61 serves as a dam and can reliably prevent water from leaking out from the insertion port 51. The waterproof wall 61 covers a lower corner portion on the insertion port 51 side of the boundary S on the upstream side of the filter arrangement area 50 as illustrated in FIG. 2. The boundary S on the upstream side of the filter arrangement area 50 is a hatched surface in FIG. 2, and corresponds to a boundary surface between the filter arrangement area 50 and the upstream-side air passage 3a of the filter arrangement area.

Figure 3:
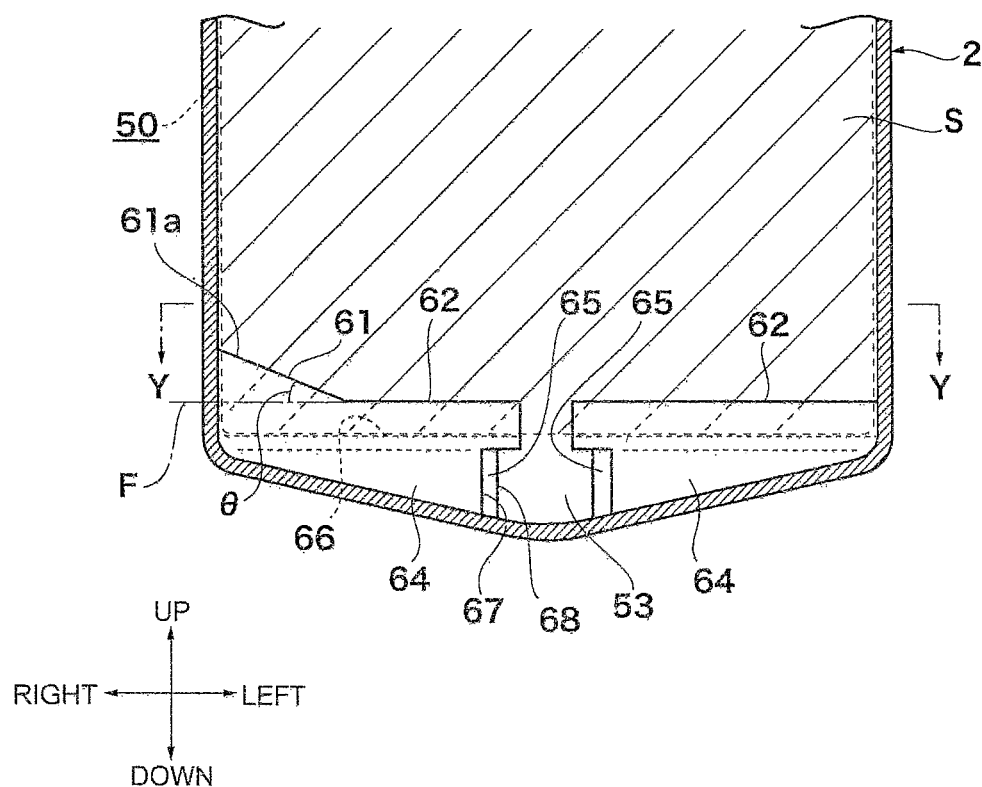
FIG. 3 is a cross-sectional view taken along a line X-X in FIG. 1.

FIG. 3 is a cross-sectional view taken along a line X-X in FIG. 1. The waterproof wall 61 is increased in height as it goes toward the insertion port 51. In FIG. 3, a mode in which a top portion 61a of the waterproof wall extends obliquely upward and linearly toward the insertion port 51 is illustrated as an example. However, the height of the waterproof wall 61 is not specifically limited as long as the height increases as it goes toward the insertion port 51. For example, the top portion 61a of the waterproof wall may have an upwardly depressed curved shape (not illustrated). When the top portion 61a of the waterproof wall extends obliquely upward and linearly toward the insertion port 51, an angle of inclination θ of the top portion 61a of the waterproof wall is preferably from 10° to 60°, and more preferably, from 20° to 45°. The angle of inclination θ is an angle formed by the top portion 61a of the waterproof wall with respect to a plane F parallel to the horizontal plane.

According to the vehicle air-conditioning apparatus 1 of the embodiment, preferably, the case 2 further includes a guide wall 62 extending along the direction of insertion D of the filter, and the waterproof wall 61 is an upward extending portion of the guide wall 62 as illustrated in FIG. 2. The guide wall 62 covers a lower portion of the boundary S on the upstream side of the filter arrangement area 50. With the provision of the guide wall 62, since the guide wall 62 guides the side surface of the filter at the time of insertion of the filter, a filter mounting operation can be performed with higher efficiency. The guide wall 62 needs at least to be located on the upstream side of the filter arrangement area 50. However, the guide wall 62 is preferably provided on the downstream side of the filter arrangement area 50 in addition to the upstream side of the filter arrangement area 50. When the case 2 has the left and right two-part structure, the guide walls 62 and 63 may have a gap G in the direction of insertion D of the filter as illustrated in FIG. 2.

According to the vehicle air-conditioning apparatus 1 of the embodiment, preferably, the case 2 further includes a pair of leg walls 64 and 65 extending upright from a bottom surface of the case 2 in parallel to each other along the direction of insertion D of the filter at a position downward of the filter arrangement area 50, and a floor wall 66 extending between the pair of leg walls 64 and 65 for placing the filter as illustrated in FIG. 1. With the floor wall 66 extending between the pair of leg walls 64 and 65, an area downward of the filter becomes a water storage portion 69, so that water leakage from the filter insertion port 51 (illustrated in FIG. 2) can be prevented even when a large amount of water flows into the apparatus at a time. In addition, the filter can be arranged with higher stability.

Furthermore, adhesion of water to the bottom surface of the filter can be prevented. The guide walls 62 and 63 preferably extend upward from the leg walls 64 and 65, respectively. Furthermore, the waterproof wall 61 preferably extends upward of the guide walls 62 and 63.

Figure 4:
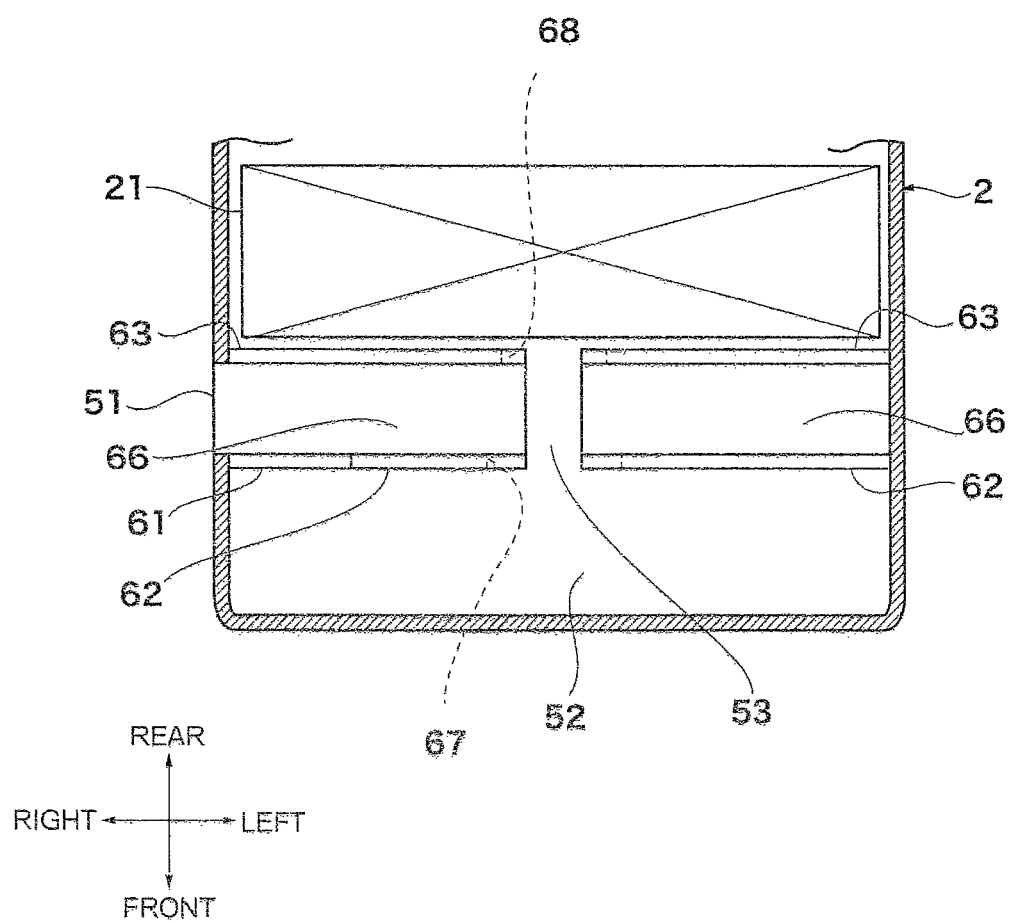
FIG. 4 is a cross-sectional view taken along a line Y-Y in FIG. 3.

FIG. 4 is a cross-sectional view taken along a line Y-Y in FIG. 3. According to the vehicle air-conditioning apparatus of the embodiment, preferably, the drain channel 53 includes an upstream pot 67 formed by notching part of the leg wall 64 (illustrated in FIG. 3) arranged on the upstream side of the air passage and a downstream port 68 formed by notching part of the leg wall 65 (illustrated in FIG. 3) arranged on the downstream side of the air passage, and the upstream port 67 is larger than the downstream port 68 as illustrated in FIG. 3 and FIG. 4. In FIG. 4, the lateral width of the upstream port 67 is larger than the lateral width of the downstream port 68. Water in the water receiving portion 52 (illustrated in FIG. 4) can be drained efficiently by the drain channel 53. The downstream port 68 is smaller than the upstream port 67. Therefore, even though air bypassing the filter arrangement area 50 flows through the drain channel 53, the amount of air bypassing the filter arrangement area 50 and flowing through the drain channel 53 can be reduced.

Figure 5:
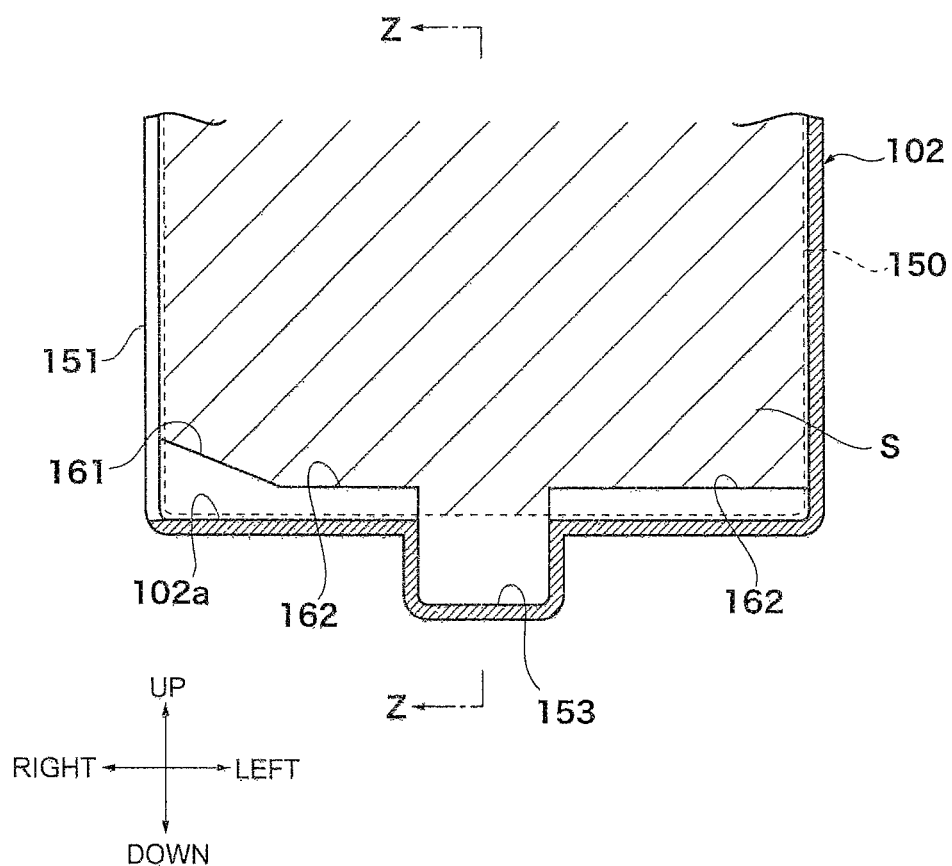
FIG. 5 illustrates a modification of the cross-sectional view taken along the line X-X in FIG. 1.
Figure 6:
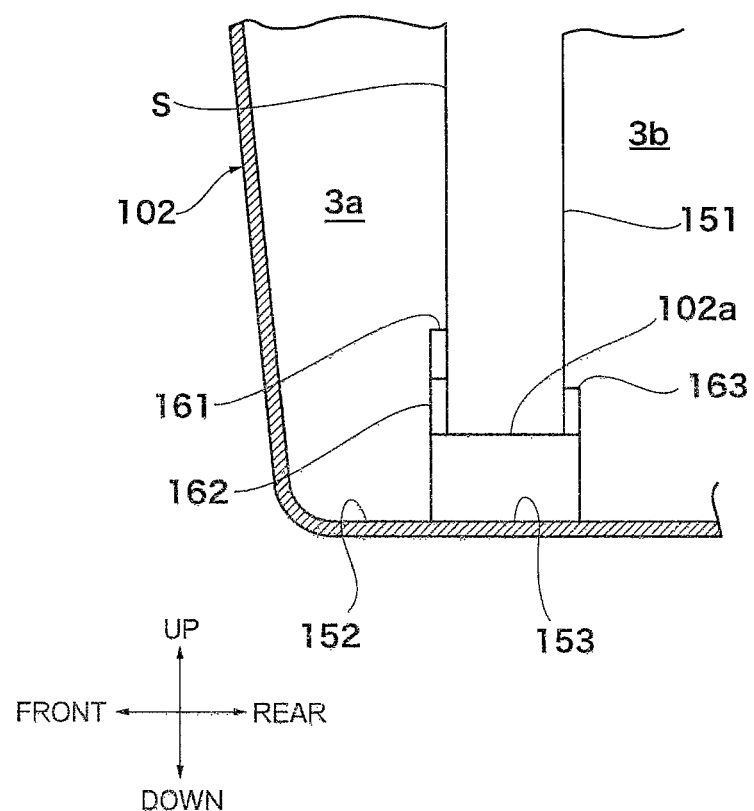
FIG. 6 is a cross-sectional view taken along a line Z-Z in FIG. 5.

FIG. 5 illustrates a modification of the cross-sectional view taken along the line X-X in FIG. 1. FIG. 6 is a cross-sectional view taken along a line Z-Z in FIG. 5. The modification will be described with reference to FIG. 5 and FIG. 6. According to the vehicle air-conditioning apparatus of the modification, preferably, a drain channel 153 and a water receiving portion 152 (illustrated in FIG. 6) are formed by depressing a bottom surface 102a of the case. When a case 102 has a structure divided into three parts, namely, left, right, and bottom parts, the drain channel 153 and the water receiving portion 152 can be formed easily. In FIG. 5 and FIG. 6, guide walls 162 and 163 extend, upright from the bottom surface 102a of the case, and a waterproof wall 161 is an upward extending portion of the guide wall 162.

According to the vehicle air-conditioning apparatus 1 of the embodiment and the modification, the filter is inserted from the insertion port 15, 151 into the filter arrangement area 50, 150, and then the insertion port 15, 151 is covered with a filter cover (not illustrated). Preferably, the filter cover (not illustrated) is not secured to the case 2 by a screw. A method of fixation of the filter cover (not illustrated) to the case 2 is not specifically limited except for fixation with the screw. For example, a method of engaging the case 2 and the filter cover with mutually engaging portions provided thereon may be used. Normally, the filter cover (not illustrated) is configured to prevent water leakage from the insertion ports 51 and 151 by providing a deformable seal member (not illustrated) such as urethane interposed between the filter cover and the case 2 and the insertion ports 51 and 151 are sealed by securing with the screw to the case 2. However, in the embodiment, the filter cover (not illustrated) can be configured to prevent water leakage from the insertion ports 51 and 151 by the waterproof walls 61 and 161 without tightly closing with the screw. Mounting and dismounting of the filter can be performed with higher degree of efficiency by avoiding screw-fastening of the filter cover. Avoiding usage of the screw contributes to a decrease in number of components. Avoiding usage of the screw and the seal member contributes to a reduction in price of products.

Although FIG. 1 illustrates the vehicle air-conditioning apparatus 1 of a mode employing a layout of a vertical-installation type in which the blower 11 is arranged in an upper portion of the vehicle. However, the invention is not limited thereto, and a horizontal installation type in which the blower 11 is arranged on the left side or the right side of the vehicle is also applicable (not illustrated).

REFERENCE SIGNS LIST

1: vehicle air-conditioning apparatus
2, 102: case
3, 3a, 3b: air passage
11: blower
21: heat exchanger for cooling
22: heat exchanger for heating
23: air-mixing door
24: drain port
31: defrost opening
32: air-ventilation opening
33: foot opening
34, 35, 36: mode door
50, 150: filter arrangement area
50a: bottom surface of filter arrangement area
51, 151: insertion port
52, 152: water receiving portion
52a: bottom surface of water receiving portion.
53, 153: drain channel
61, 161: waterproof wall
61a: top portion of waterproof walls
62, 63, 162, 163: guide wall
64, 65: leg wall
66: floor wall
67: upstream port
68: downstream port
69: water storage portion
102a: bottom surface of case
D: direction of insertion of filter
F: surface parallel to horizontal plane
G: gap
S: boundary on upstream side of filter arrangement area

What is claimed is:

1. A vehicle air-conditioning apparatus comprising:
a case including an air passage in an interior thereof; and
a filter arrangement area provided in the air passage for arranging a filter, wherein the case includes:
a drain port provided on a bottom portion of a downstream-side air passage in the filter arrangement area;
an insertion port provided on a side surface of the case and configured to allow insertion of the filter into the filter arrangement area;
a water receiving portion provided on a bottom portion of an upstream air passage in the filter arrangement area;
a drain channel passing below the filter arrangement area and configured to introduce water from the water receiving portion to the drain port; and
a waterproof wall configured to cover a lower corner portion on the insertion port side of an upstream-side boundary of the filter arrangement area,
wherein the waterproof wall increases in height as the waterproof wall goes toward the insertion port, and
wherein the waterproof wall projects from an inner wall surface out of the side surface of the case on which the insertion port is provided.

2. The vehicle air-conditioning apparatus according to claim 1, wherein the drain channel passes through a center of the filter arrangement.

3. The vehicle air-conditioning apparatus according to claim 1, wherein the case further includes a guide wall extending along the direction of insertion of the filter, and the waterproof wall is an upward extending portion of the guide wall.

4. The vehicle air-conditioning apparatus according to claim 1, wherein the case further includes a pair of leg walls extending upright from a bottom surface of the case in parallel to each other along the direction of insertion of the filter at a position downward of the filter arrangement area, and a floor wall extending between the pair of leg walls for placing the filter.

5. The vehicle air-conditioning apparatus according to claim 4, wherein the drain channel includes an upstream port formed by notching part of the leg wall arranged on the upstream side of the air passage and a downstream port formed by notching part of the leg wall arranged on the downstream side of the air passage, and the upstream port is larger than the downstream port.

6. The vehicle air-conditioning apparatus according to claim 1, wherein the drain channel and the water receiving portion are formed by depressing a bottom surface of the case.

7. The vehicle air-conditioning apparatus according to claim 2, wherein the case further includes a guide wall extending along the direction of insertion of the filter, and the waterproof wall is an upward extending portion of the guide wall.

8. The vehicle air-conditioning apparatus according to claim 2, wherein the case further includes a pair of leg walls extending upright from a bottom surface of the case in parallel to each other along the direction of insertion of the filter at a position downward of the filter arrangement area, and a floor wall extending between the pair of leg walls for placing the filter.

9. The vehicle air-conditioning apparatus according to claim 3, wherein the case further includes a pair of leg walls extending upright from a bottom surface of the case in parallel to each other along the direction of insertion of the filter at a position downward of the filter arrangement area, and a floor wall extending between the pair of leg walls for placing the filter.

10. The vehicle air-conditioning apparatus according to claim 8, wherein the drain channel includes an upstream port formed by notching part of the leg wall arranged on the upstream side of the air passage and a downstream port formed by notching part of the leg wall arranged on the downstream side of the air passage, and the upstream port is larger than the downstream port.

11. The vehicle air-conditioning apparatus according to claim 2, wherein the drain channel and the water receiving portion are formed by depressing a bottom surface of the case.

12. The vehicle air-conditioning apparatus according to claim 3, wherein the drain channel and the water receiving portion are formed by depressing a bottom surface of the case.

* * * * *